UNITED STATES PATENT OFFICE.

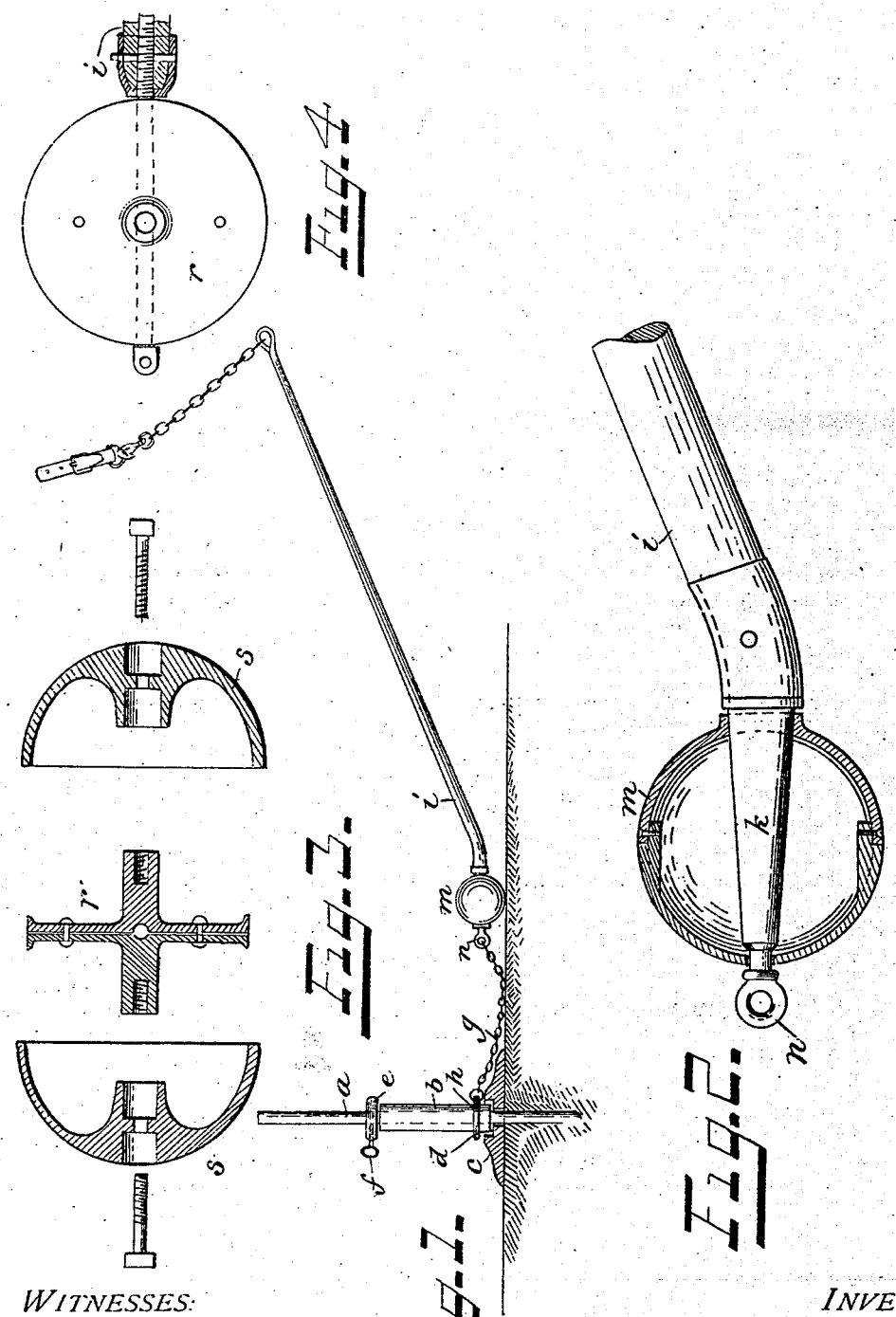

JAMES L. SCHAAFF, OF GLENCARLYN, VIRGINIA.

ANIMAL-TETHER.

No. 802,411. Specification of Letters Patent. Patented Oct. 24, 1905.

Application filed September 28, 1904. Serial No. 226,396.

*To all whom it may concern:*

Be it known that I, JAMES L. SCHAAFF, a citizen of the United States, residing at Glencarlyn, in the county of Alexandria and State of Virginia, have invented certain new and useful Improvements in Animal-Tethers, of which the following is a specification.

My invention relates to animal-tethers; and the object thereof is to provide an article of the character stated which is particularly simple in construction and highly efficient in operation in that it makes provision against the connecting member, running from the anchor-stake to the animal becoming engaged with the legs of the latter and in addition assures the animal having at all times the benefit of the full range of movement provided for by the maximum length of said connecting member.

To this end the invention includes the combination and arrangement of component parts to be hereinafter described, and particularly pointed out in the claims.

In the accompanying drawings, which illustrate one exemplification of my invention, Figure 1 shows the device in elevation in the position occupied by the parts when the device is in use. Fig. 2 is a detail sectional view of a portion of one section of a part of the device, and Figs. 3 and 4 are detail views of a modification.

The invention includes generally an anchor-stake and a connecting member comprising a flexible section and a rigid section, the latter being secured adjacent one of its ends to the animal and at its opposite end to the flexible member, the latter end being designed to rest upon the ground and including means for insuring the free and unobstructed movement thereof in all directions. In the illustrated embodiment of my invention an anchor-stake is shown of such a construction as to admit of it being readily moved from place to place and secured in the ground. It includes a pin or post $a$, designed to be driven into the ground, and a rotatable member $b$, mounted upon the portion thereof projecting above the ground, to which one end of a connecting member, to be hereinafter described, is secured. The member $b$ is shown herein as a sleeve loosely fitting the pin $a$, so as to turn freely thereon, and in order to facilitate this movement a bearing is preferably provided for the lower end of the sleeve, which in the present instance is shown as a disk $c$, intended to rest upon the ground, having a central opening to receive the pin $a$ and a concentric recess or depression $d$ to receive the end of the rotatable member $b$. A retaining-collar $e$ is removably secured to the pin $a$ above the upper end of the member $b$ and is retained in place by a set-screw $f$.

The member for connecting the animal to the stake comprises a flexible section $g$, provided with a ring $h$ at its inner end for loosely encircling the member $b$ and with a suitable hook or link at its outer end for engaging the inner end of the outer section $i$ of the connecting member. The latter section comprises a light strip or rod having means at its outer end for securing the same to the halter or other part of the animal's harness in close proximity to the animal's head, so it will be supported a distance above the animal's legs, and is deflected near its opposite end to provide a minor portion $k$, which is disposed at an angle to the main portion of said section. A roller-bearing is suitably journaled upon the portion $k$, which is of such a construction as to admit of it turning readily as the animal moves in a path substantially concentric to the stake and riding easily over the ground as the animal approaches the stake or moves in a direction tangentially to an arc concentric with the stake. The illustrated exemplification of this bearing member comprises a light shell, preferably substantially spherical in shape, through which the portion $k$ extends to provide a journal for the shell. If desired, this journal may be provided with a suitable wearing-sleeve, which may also, if desired, serve to connect the major portion of the member $i$ with the minor portion $k$ should said member be constructed of two sections. As will be appreciated, the inner end of the section will be supported by the bearing $m$ in an elevated position, so that it will readily pass over the ground and easily ride any slight hills or obstructions even when the animal moves in such a direction that the rigid section is pushed before it or in the direction of the length thereof. The minor portion $k$ preferably has a part extending beyond the inner end of the member $m$ which terminates in an eye $n$, designed to be engaged by the outer end of the section $g$.

As will be understood, the rigid section $i$, supported at one end adjacent to the animal's head and at its other end upon the ground a distance from the animal, precludes the connecting member from contacting with the animal's legs and rubbing or chafing the same, which frequently occurs in a tethering device in which the connecting member is flexible throughout, while the peculiar bearing provided for the inner end of the section *i* insures as free movement for the animal in all directions as if the entire connecting member were flexible. It will also be noted that the rotatable member *b* prevents the flexible section *g* of the connecting member from becoming wound about the stake, and thus the range of movement of the animal is maintained irrespective of the number of times it may walk around the anchor-stake.

Figs. 4 and 5 show a modified construction of bearing member. This form of bearing member includes a major movable section and one or more minor sections rotatable upon an axis disposed at an angle to the axis upon which the major section rotates. The major section is designated by *r* and in the present exemplification of my invention is shown as a disk journaled upon the end of the section *i* and designed to rotate thereon as the animal moves in a direction substantially concentric to the stake. The minor sections (indicated by *s*) are located upon opposite sides of the major section and in the present exemplification of my invention are shown as formed by hemispherical shells having inwardly-extending sleeves, which are journaled upon pintles extending laterally from the center of the major section. In the movement of the animal toward and from the stake the minor sections will rotate, and thus facilitate the movement of the lower end of the section *i*. It will be understood, of course, that when this bearing member is assembled the edges of the section *s* will be separated a sufficient distance to accommodate the section *i*.

The construction and operation of the herein-described invention will be readily understood upon reference to the foregoing description and accompanying drawings, and it will be appreciated that the parts and combinations recited may be varied within a wide range without departing from the spirit and scope thereof.

Having thus described my invention, what is claimed as new, and desired to be secured by Letters Patent, is—

1. In a tethering device, the combination with a stake, of a connecting member comprising a flexible section and a substantially rigid section, means at the outer end of the latter for the securement of the same to the animal, and a movable supporting member at the opposite end of said rigid section, substantially as described.

2. In a tethering device, the combination with a stake, of a connecting member comprising a flexible section and a substantially rigid section, means at the outer end of the latter for the securement of the same to the animal, and means at its opposite end for holding the latter end elevated, substantially as described.

3. In a tethering device, the combination with a stake, of a connecting member comprising a flexible section and a substantially rigid section, means at the outer end of the latter for the securement of the same to the animal, and means at its opposite end for holding the latter end elevated, said means being rotatable, substantially as described.

4. In a tethering device, the combination with a stake, of a connecting member comprising a flexible section and a rigid section, means at the outer end of the latter for the securement of the same to the animal, and a bearing member journaled upon the opposite end of said rigid section, substantially as described.

5. In a tethering device, the combination with a stake, of a connecting member comprising a flexible section and a rigid section, means at the outer end of the latter for the securement of the same to the animal, said rigid section having a deflected portion, and a bearing member mounted on the latter, substantially as described.

6. In a tethering device, the combination with a stake, of a connecting member comprising a flexible section and a rigid section, means at the outer end of the latter for the securement of the same to the animal, said rigid section having a deflected portion, and a bearing member mounted on the latter having a convexed peripheral surface, substantially as described.

7. In a tethering device, the combination with a stake, of a connecting member comprising a flexible section and a rigid section, means at the outer end of the latter for the securement of the same to the animal, said rigid section having a deflected portion, and a bearing member journaled thereon, said bearing member having substantially hemispherical ends, substantially as described.

8. In a tethering device, the combination with a stake, of a connecting member comprising a flexible section and a rigid section, means at the outer end of the latter for the securement of the same to the animal, said rigid section having a deflected portion, and a shell journaled upon said deflected portion having substantially hemispherical opposite ends, substantially as described.

9. In a tethering device, the combination with a stake, of a connecting member comprising a flexible section and a rigid section, the latter including a substantially straight major portion and a deflected minor portion, and a bearing member journaled on the minor portion having a substantially bulbous advancing part, substantially as described.

10. In a tethering device, the combination with a connecting member having a ring at the inner end thereof, of an anchor-stake comprising a post or pin, a sleeve loosely fitted thereto designed to be engaged by said ring, and a bearing-disk for said sleeve, substantially as described.

11. An anchor-stake comprising a pin or post, a sleeve loosely fitting the same, a disk having an opening therein to receive the pin and a concentric depression to receive the lower end of the sleeve, and a collar secured to the pin above said sleeve, substantially as described.

12. In a tethering device, the combination with a strip or pole, of a bearing member for one end thereof comprising sections movable at angles to each other, substantially as described.

13. In a tethering device, the combination with a strip or pole, of a bearing member for one end thereof comprising central and side sections movable at angles to each other, substantially as described.

14. In a tethering device, the combination with a strip or pole, of a bearing member for one end thereof comprising sections rotatable upon axes disposed at angles to each other, substantially as described.

15. In a tethering device, the combination with a strip or pole, of a bearing member for one end thereof comprising a main rotatable section and minor sections carried thereby, substantially as described.

16. In a tethering device, the combination with a strip or pole, of a bearing member for one end thereof, comprising a main rotatable section and minor sections journaled therein, substantially as described.

17. In a tethering device, the combination with a strip or pole, of a bearing member for one end thereof, comprising a main rotatable section and minor sections journaled upon pintles extending laterally therefrom, substantially as described.

18. In a tethering device, the combination with a strip or pole, of a bearing member comprising a main section journaled upon the end of said pole to rotate upon an axis extending in a direction substantially lengthwise of the pole and minor sections mounted to rotate upon an axis extending substantially transversely in relation to the length of the pole, substantially as described.

19. In a tethering device, the combination with a strip or pole, of a bearing member therefor comprising a disk-shaped major section and minor sections formed by hemispherical shells, substantially as described.

20. In a tethering device, the combination with a strip or pole, of a bearing member therefor comprising a substantially disk-shaped major section having pintles extending from opposite sides thereof and minor sections formed of substantially hemispherical shells having inwardly-extending sleeves journaled upon said pintles, substantially as described.

21. In a tethering device, a pole or strip provided with rounded enlargement at one end, substantially as described.

22. In a tethering device, a pole or strip provided with substantially ball-shaped enlargement at one end, substantially as described.

23. In a tethering device, a pole or strip deflected near one end, and a rounded enlargement secured thereto, substantially as described.

24. In a tethering device, a pole or strip deflected near one end, and a rounded enlargement journaled upon said deflected portion, substantially as described.

25. In a tethering device, a strip or pole having a substantially ball-shaped roller at one end, substantially as described.

26. In a tethering device, a pole or strip having attaching means at one end, a deflected portion at its opposite end, and other attaching means at the end of said deflected portion, and a substantially ball-shaped bearing member journaled upon said deflected portion, substantially as described.

In testimony whereof I have hereunto signed my name, in the presence of two attesting witnesses, at Washington, District of Columbia, this 17th day of September, 1904.

JAMES L. SCHAAFF.

Witnesses:
W. M. HOFFMAN,
WILLIAM F. HALL.